(12) United States Patent
Brandao et al.

(10) Patent No.: US 7,724,178 B2
(45) Date of Patent: May 25, 2010

(54) TRAFFIC ALERT COLLISION AVOIDANCE SYSTEM (TCAS) DEVICES AND METHODS

(75) Inventors: Ruy L. Brandao, Ft. Lauderdale, FL (US); Ruy C. Brandao, Sr., Redmond, WA (US); Christine M. Haissig, Chanhassen, MN (US); John Weed, Mill Creek, WA (US); Eric A. Euteneuer, Minneapolis, MN (US)

(73) Assignee: Honeywell International Inc., Morristown, NJ (US)

(*) Notice: Subject to any disclaimer, the term of this patent is extended or adjusted under 35 U.S.C. 154(b) by 456 days.

(21) Appl. No.: 11/303,873

(22) Filed: Dec. 17, 2005

(65) Prior Publication Data

US 2006/0267829 A1 Nov. 30, 2006

Related U.S. Application Data

(63) Continuation-in-part of application No. 11/161,873, filed on Aug. 19, 2005.

(60) Provisional application No. 60/637,267, filed on Dec. 17, 2004.

(51) Int. Cl.
G01S 13/75 (2006.01)
G01S 13/93 (2006.01)
G01S 13/00 (2006.01)

(52) U.S. Cl. .......................... 342/29; 342/30; 342/36; 342/42; 342/46; 342/118; 342/146; 342/147; 342/175; 342/450; 342/454; 342/455

(58) Field of Classification Search .............. 342/29–51, 342/175, 195, 118, 119, 125, 146–158, 450–465; 701/3, 300–302, 200, 207; 340/945, 961
See application file for complete search history.

(56) References Cited

U.S. PATENT DOCUMENTS

| | | | | |
|---|---|---|---|---|
| 4,855,748 A | * | 8/1989 | Brandao et al. | 701/301 |
| 4,914,733 A | * | 4/1990 | Gralnick | 340/961 |
| 4,929,958 A | | 5/1990 | Hodel et al. | |
| 5,179,377 A | * | 1/1993 | Hancock | 340/961 |
| 5,248,968 A | * | 9/1993 | Kelly et al. | 340/961 |
| 5,382,954 A | * | 1/1995 | Kennedy et al. | 340/961 |
| 5,636,123 A | * | 6/1997 | Rich et al. | 701/207 |
| 6,085,150 A | * | 7/2000 | Henry et al. | 701/301 |
| 6,160,497 A | * | 12/2000 | Clark | 340/961 |
| 6,169,519 B1 | * | 1/2001 | Holecek et al. | 342/442 |

(Continued)

OTHER PUBLICATIONS

Higgins, W.T., A comparison of Complementary and Kalman Filtering; IEEE Transactions; vol. AES-11, No. 3, May 1975.

(Continued)

*Primary Examiner*—Bernarr E Gregory
(74) *Attorney, Agent, or Firm*—Black Lowe & Graham PLLC

(57) ABSTRACT

A device for determining the bearing of a vehicle using Inertial Reference Unit (IRU) and Traffic Alert Collision Avoidance System (TCAS) data. The device includes a means to communicate with the vehicle such as a transmitter, receiver, and antenna. The device also includes a processor configured to receive the IRU and TCAS data from the vehicle via the communication means and then generate a bearing value using the received data.

17 Claims, 12 Drawing Sheets

U.S. PATENT DOCUMENTS

| | | | |
|---|---|---|---|
| 6,177,888 B1 | 1/2001 | Cabot et al. | |
| 6,208,284 B1 * | 3/2001 | Woodell et al. | 342/30 |
| 6,252,525 B1 * | 6/2001 | Philiben | 340/961 |
| 6,262,679 B1 * | 7/2001 | Tran | 342/29 |
| 6,271,768 B1 | 8/2001 | Frazier, Jr. et al. | |
| 6,275,172 B1 * | 8/2001 | Curtis et al. | 340/961 |
| 6,278,396 B1 * | 8/2001 | Tran | 342/29 |
| 6,329,947 B2 | 12/2001 | Smith | |
| 6,459,411 B2 * | 10/2002 | Frazier et al. | 342/30 |
| 6,531,978 B2 * | 3/2003 | Tran | 342/29 |
| 6,683,562 B2 * | 1/2004 | Stayton et al. | 340/961 |
| 6,911,936 B2 * | 6/2005 | Stayton et al. | 340/961 |
| 6,967,616 B2 * | 11/2005 | Etnyre | 342/175 |
| 7,006,032 B2 * | 2/2006 | King et al. | 342/29 |
| 7,116,266 B1 * | 10/2006 | Vesel et al. | 342/30 |
| 2002/0011950 A1 * | 1/2002 | Frazier et al. | 342/30 |
| 2002/0080059 A1 * | 6/2002 | Tran | 342/29 |
| 2003/0016158 A1 * | 1/2003 | Stayton et al. | 342/29 |
| 2004/0174295 A1 * | 9/2004 | Stayton et al. | 342/195 |
| 2005/0156777 A1 | 7/2005 | King et al. | |

OTHER PUBLICATIONS

Farrell J.A., et al., Two antennas GPS-aided INS for attitude determination; IEEE Transactions, New York; vol. 11, No. 6, November 204 (Nov. 2003).

Doyle, R.S. et al., Multi-sensor data fusion for helicopter guidance using neuro-fuzzy estimation algorithms; IEEE International Conference, Vancouver, BC, Canada Oct. 1995, vol. 2.

Bernays, D.J. et al., Validation techniques for ads-b surveillance data; Digital Avionics Systems Conference, New York, NY, IEEE US, vol. 1 of 2 Conf. 21, Oct. 2002.

Sampath, K.S. et al.; Analysis and simulation of collision avoidance TCAS antennas mounted on aircraft; Antennas and Propagation Society International SYmposium; AP-S, Digest Jun. 24-28, 1991, pp. 948-951 vol. 2, XP10050766.

* cited by examiner

| STANDARD TRANSPONDER REPLY | ADS-B SIGNAL |
|---|---|
| 10 | 5 |
| 15 | 20 |
| 20 | 25 |
| . | . |
| . | . |
| . | . |

FIG. 4

| STANDARD TRANSPONDER REPLY | ADS-B | $\overline{x}$ |
|---|---|---|
| 10 | 5 | 7.5 |
| 15 | 20 | 17.5 |
| 20 | 25 | 22.5 |
| . | . | . |
| . | . | . |
| . | . | . |

| RAW BEARING | ANTENNA SELECTED | ANTENNA FRAME ELEVATION ANGLE | CORRECTED VALUE |
|---|---|---|---|
| 10 | 1 | 0 | 5 |
| 15 | 1 | 0 | 20 |
| 20 | 1 | 0 | 25 |
| 10 | 2 | 0 | 7 |
| 15 | 2 | 0 | 19 |
| 20 | 2 | 0 | 24 |
| 10 | 1 | 10 | 6 |
| 15 | 1 | 10 | 22 |
| 20 | 1 | 10 | 26 |
| 10 | 2 | 10 | 7.5 |
| 15 | 2 | 10 | 19.5 |
| 20 | 2 | 10 | 25 |
| 10 | 1 | 20 | 6.5 |
| 15 | 1 | 20 | 23 |
| 20 | 1 | 20 | 26.5 |
| 10 | 2 | 20 | 8.5 |
| 15 | 2 | 20 | 22 |
| 20 | 2 | 20 | 26 |
| . | . | . | . |
| . | . | . | . |
| . | . | . | . |

132

TRAFFIC ALERT COLLISION AVOIDANCE SYSTEM (TCAS) DEVICES AND METHODS

PRIORITY CLAIM

This application claims the benefit of U.S. patent application Ser. No. 60/637,267, filed on Dec. 17, 2004 which is hereby incorporated by reference.

This application is a continuation in part of U.S. patent application Ser. No. 11/161,873, filed on Aug. 19, 2005, which is hereby incorporated by reference.

BACKGROUND OF THE INVENTION

Data available for determining azimuth value of Traffic Alert Collision Avoidance System (TCAS) consists of raw TCAS data sampled at 1 Hz, all ownship data provided at mission computer rates, and Inertial Reference Unit (IRU) data from an othership reported over a standard Automatic Dependent Surveillance Broadcast (ADS-B) data-link at 2 Hz. TCAS and/or IRU data alone do not provide sufficient accuracy and precision to maintain flight formation within desired limits. Current TCAS devices provide reported azimuth data having a RMS (root mean square) error in the range of 6 to 7 degrees.

An improved TCAS azimuth computing device with smaller error is desirable for increased flight formation capability.

SUMMARY OF THE INVENTION

A device for determining the bearing of a vehicle using Inertial Reference Unit (IRU) and Traffic Alert Collision Avoidance System (TCAS) data is provided. In an embodiment where one aircraft (own aircraft) is determining the bearing of a second aircraft, bearing is defined to be the relative angle between own aircraft and the second aircraft. The device includes a means to communicate with the vehicle such as a transmitter, receiver, and antenna. The device also includes a processor configured to receive the IRU and TCAS data from the vehicle via the communication means and then generate a bearing value using the received data. The smoothness of the IRU data is used to refine the accuracy of the TCAS information. This provides a more precise and accurate bearing determination with smaller error than either current TCAS devices or ownship and transmitted othership IRU data can provide.

BRIEF DESCRIPTION OF THE DRAWINGS

FIG. 4 is a multi-dimensional table in accordance with still another embodiment of the present invention;

FIG. 5 is a multi-dimensional table in accordance with yet another embodiment of the present invention.

FIG. 9 illustrates an example multi-dimensional correction table in accordance with another embodiment of the present invention;

DETAILED DESCRIPTION OF THE PREFERRED EMBODIMENT

Figure 1:
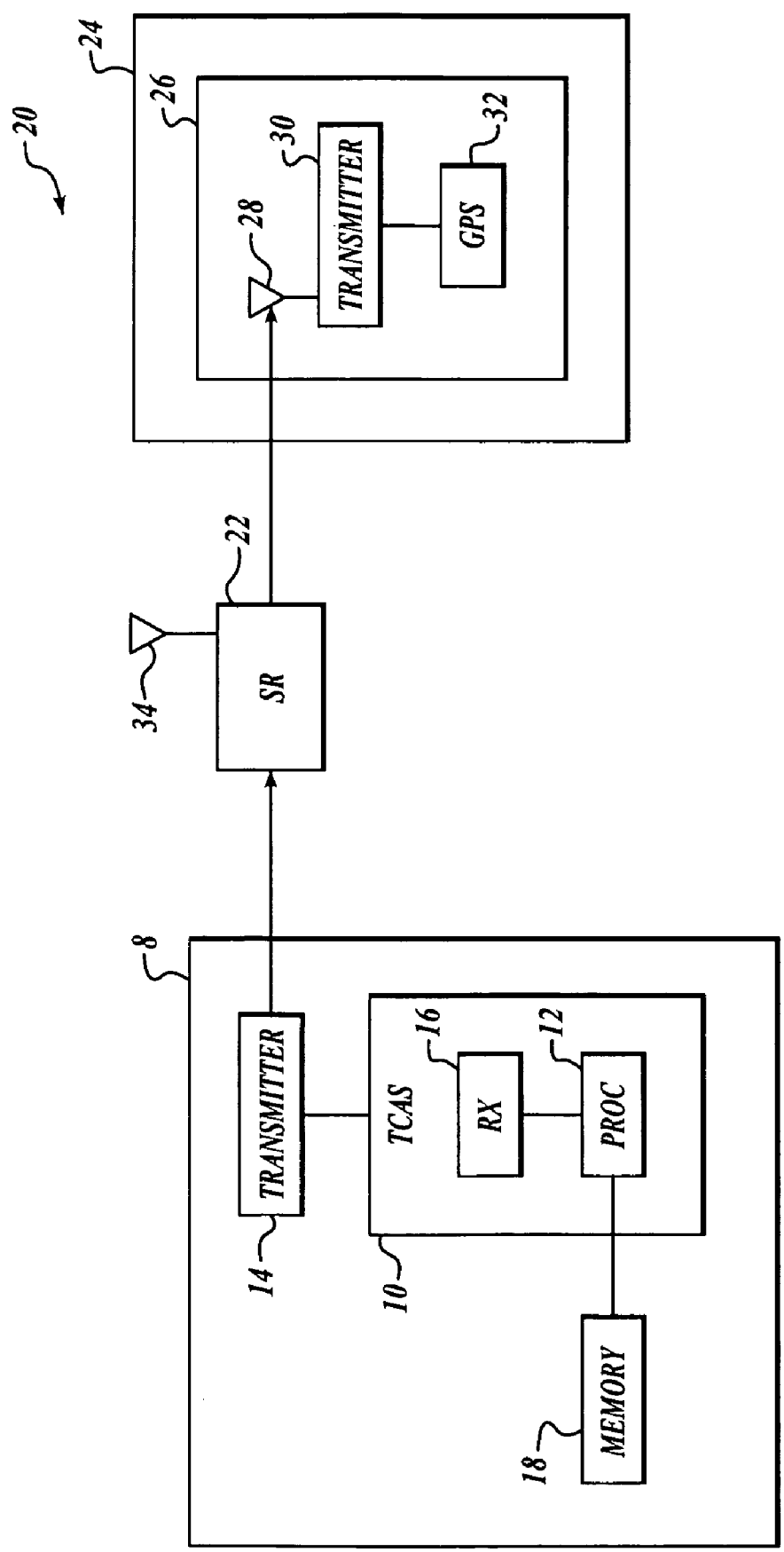
FIG. 1 illustrates a schematic view of the system in accordance with an embodiment of the present invention.

FIG. 1 illustrates a schematic view of an example system 20. In one embodiment, the system 20 includes a TCAS system 10 aboard a host aircraft 8 that includes a processor 12, a transmitter 14, and a receiver 16. The transmitter 14 generates an interrogation signal based upon surveillance alerts, such as approaching aircraft and threat potentials, produced by a surveillance radar 22. The surveillance radar 22 transmits TCAS transmitter 14 interrogation signals and receives replies at a receiving device 34. A target aircraft 24 includes a surveillance system 26 that receives the interrogation signal at a transmitter receiving device 28 and when interrogated generates a standard transponder reply signal via a transmitter 30. The target aircraft 24 surveillance system 26 may also send an Automatic Dependent Surveillance Broadcast (ADS-B) reply signal via a navigational component such as a Global Positioning System (GPS) 32, whenever ADS-B data is available.

ADS-B data provides automatic or autopilot capabilities (i.e. it is always on and requires no operator intervention) and uses accurate position and velocity data from aircraft navigation systems, including latitude and longitude measurements. ADS-B broadcasts aircraft position, altitude, velocity and other data that can be used by air traffic control and other aircraft to share the aircraft's position and altitude without the need for radar.

Whenever the system 20 is not broadcasting, it is listening for Mode-S squitters and reply transmissions at the same frequency used by Mode-S transponders to reply to interrogation signals. Mode-S is a combined secondary surveillance radar and a ground-air-ground data link system which provides aircraft surveillance and communication necessary to support automated air traffic control in dense air traffic environments. Once per second, the Mode-S transponder spontaneously and pseudo-randomly transmits (squits) an unsolicited broadcast. Whenever the Mode-S is not broadcasting, it is monitoring or listening for transmissions. Thus, a TCAS equipped aircraft can see other aircraft carrying a transponder. Once a transponder equipped target has been seen, the target is tracked and a threat potential is determined. Altitude information is essential in determining a target's threat potential. Comparison between the altitude information encoded in the reply transmission from the target aircraft 24 and the host aircraft 8 is made in the processor 12 and the pilot is directed to obtain a safe altitude separation by descending, ascending or maintaining current altitude.

Knowledge of the direction, or bearing, of the target aircraft 24 relative to the host aircraft 8 greatly enhances the pilot's ability to visually acquire the threat aircraft and provides a better spatial perspective of the threat aircraft relative to the host aircraft. The processor 12 can display bearing information if it is available. Bearing information is also used by the processor 12 to determine threat potential presented by an intruder aircraft.

The system 20 determines relative bearing by sending the interrogation signal to the target aircraft 24 and listening for replies that return from the target aircraft 24. The reply from the target aircraft 24 may include a standard transponder reply and an ADS-B reply signal. The standard transponder reply gives an estimated bearing by measuring the multi-path interference from the target aircraft 24, including phase and amplitude measurements, speed direction, and altitude. The ADS-B reply signal includes the more accurate bearing measurements of latitude and longitude. When the target aircraft 24 has generated replies to the TCAS 10 interrogation signal, the standard transponder reply and/or the ADS-B reply signal is received by the TCAS receiver 16 and stored in a memory device 18 coupled to the processor 12. The memory device 18 collects varying signals and stores them in an internal database for later use by the processor 12 in determining bearing when ADS-B data is unavailable.

Algorithms within the processor 12 use the relationships between estimated bearing based on standard transponder replies versus bearing computed from ADS-B signals to generate a table or other multi-dimensional expression of the database of information stored in the memory 18. Further, the processor 12 corrects values between the standard transponder reply and ADS-B reply signals to more accurately determine bearing, including averaging the standard transponder reply values and ADS-B values and associating the ADS-B values to previously stored standard transponder reply values (see FIGS. 4 and 5).

Figure 2:
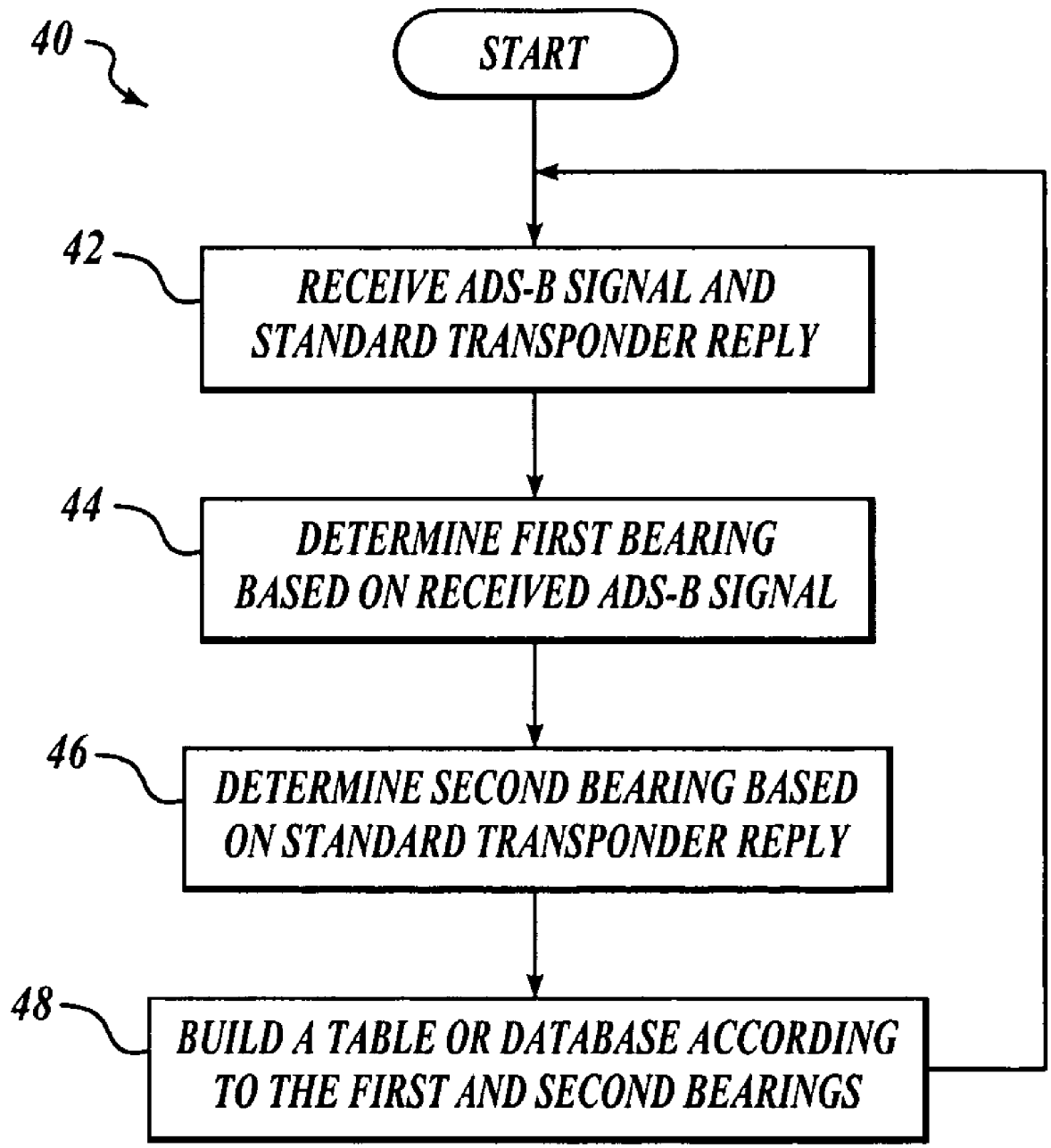
FIG. 2 is a flowchart of a method of building a database using ADS-B data in accordance with an alternate embodiment of the present invention.

FIG. 2 is a flowchart of an example method 40 of building a table in accordance with an embodiment of the invention. At a block 42, the TCAS receiver 16 receives ADS-B signals and standard transponder reply signals from a target aircraft 24. The processor 12 determines a first bearing based on the ADS-B reply signal at a block 44. It will be appreciated, however, that the processor 12 may determine a first bearing based on the standard reply and a second bearing based on the ADS-B reply signal. In one embodiment, at a block 46, the processor 12 determines a second bearing based on the standard transponder reply. At a block 48, a table or database is built according to ADS-B signals and the standard transponder reply data. The table or multidimensional database may include a comparison between standard transponder reply data versus ADS-B data and correction factors.

Figure 3:
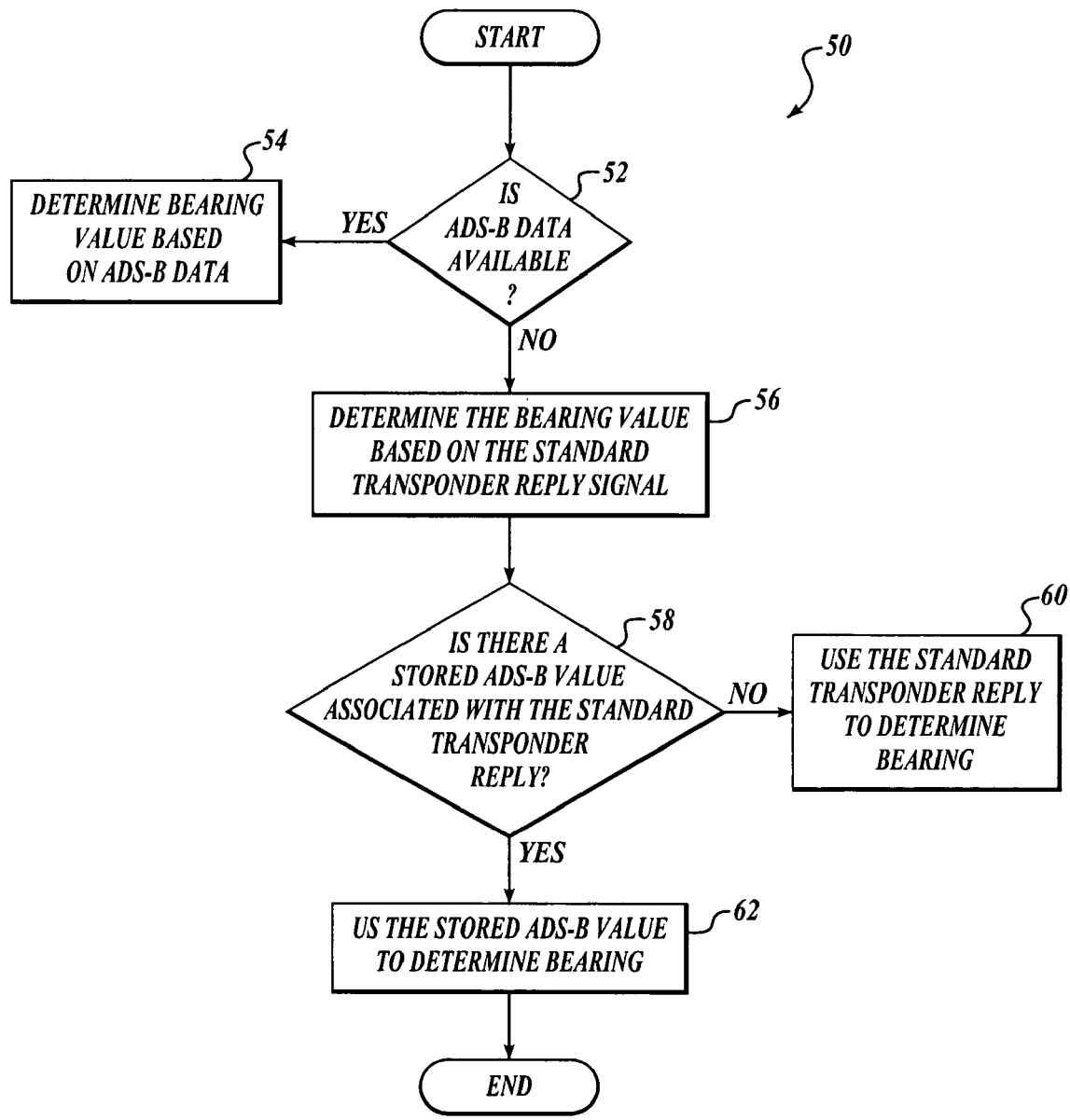
FIG. 3 is a flowchart of a method of determining bearing using the database developed with FIG. 2 in accordance with another embodiment of the present invention.

FIG. 3 is a flowchart of a method of determining bearing using the database developed with reference to FIG. 2. At a determination block 52, a determination is made as to whether ADS-B data is available. This determination is usually performed once during the process. If ADS-B data is available, bearing is determined using the ADS-B data, at a block 54. If ADS-B data is not available, bearing is determined by using the standard transponder reply signals, at a block 56.

At a block 58, a determination is made as to whether there is an ADS-B value associated with the standard transponder reply as previously stored in the database. If no associated ADS-B value is stored in the database, the standard transponder reply is used to determine relative bearing at a block 60. If associated ADS-B values are available, the associated ADS-B values previously stored in the database are used to determine bearing at a block 62.

FIG. 4 is a multi-dimensional table developed in accordance with an embodiment of the present invention. In one embodiment, the table includes a look-up table. One will appreciate, however, that any table or graphical representation of the data is applicable and may be suitably employed. For example, alternate embodiments include any multi-dimensional table or relational database. Referring still to FIG. 4, the table includes at least two measurements of data—standard transponder reply data and ADS-B data. As shown in FIG. 5, an alternate embodiment of the table includes a correction factor, or average $\bar{x}$, between the two measurements. In other embodiments, the table includes other look-up parameters. For example, the TCAS may receive an ADS-B signal via a DF-17 where the processor 12 computes parameters based on the ADS-B signal, including, received azimuth or bearing of the ADS-B signal and other characteristics of the received signal which help characterize the received signal, i.e. estimation of signal frequency and amplitude of received signal and time of arrival. In one embodiment, the TCAS 10 extracts the following information from data encoded in the ADS-B signal latitude, longitude, and relative altitude.

Further, the table is processed by the processor 12 so that entries for the same bearing, elevation angle, etc. will be averaged or filtered with data already in the table to improve and smooth data already in the table. In one embodiment, the table or data is stored in some kind of non-volatile memory (NVM) so that it can be used at a later time—even after the TCAS 10 has been powered off. In another embodiment, data is continuously improved and updated. In an alternate embodiment, the data is stored so that it can be available when ADS-B signals or latitudes, longitude data is not available in a standard interrogation/reply TCAS surveillance, especially when GPS data is not available either from a particular aircraft or generally not available to any particular area. In this particular embodiment, where ADS-B values are not available, associated standard values with reference to previously stored ADS-B values may be employed to determine bearing.

Figure 6:
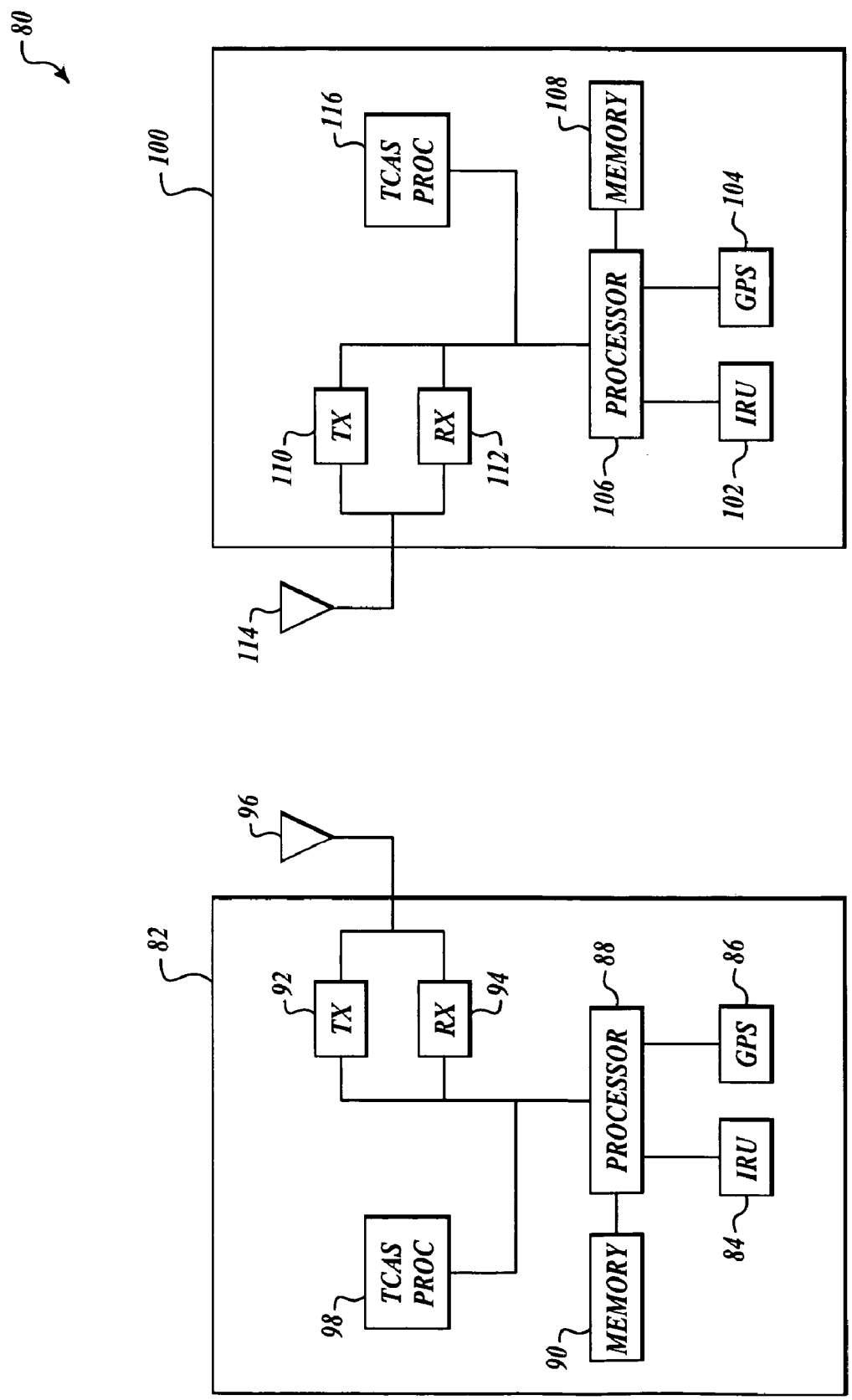
FIGS. 6-8 illustrate schematic views of a TCAS system in accordance with an embodiment of the present invention.

FIG. 6 illustrates a schematic view of an example system 80. In one embodiment, the system 80 includes a first aircraft 82 having a number of system components on board. The system components include an Inertial Reference Unit (IRU) 84 and a global positioning system (GPS) 86 or comparable devices, both in data communication with a processor 88, a memory unit 90 in data communication with the processor 88, a transmitter (TX) 92 and a receiver (RX) 94 both in data communication with the processor 88 and connected to an antenna 96. It is also possible to have a dedicated Traffic Alert Collision Avoidance System (TCAS) processor 98 in data communication with the transmitter 92 and the receiver 94 as well. The functions performed by the processor 88 may be performed by the TCAS processor 98 in embodiments where the TCAS processor 98 is an element of the system 80. The first aircraft 82 determines a more accurate bearing of a second aircraft 100 in relation to itself. The aircraft 100 has similar components to those present in the first aircraft 82. The second aircraft 100 includes an IRU 102 and a GPS 104 both in data communication with a processor 106, a memory unit 108 in data communication with the processor 106, a TX 110 and a RX 112 both in data communication with the processor 106, and transmitting and receiving via an antenna 114. The aircraft 100 can also include a dedicated TCAS processor 116 in data communication with both the TX 110, the RX 112, and the processor 106.

The processor 88 and the transmitter 92 contained in the first aircraft 82 generate an interrogation signal that is transmitted by the antenna 96 and received via the antenna 114 and the receiver 112 of the second aircraft 100. The processor 106 and the transmitter 110 of the second aircraft 100 respond with standard TCAS information in the case of a TCAS type interrogation transmitted by the first aircraft 82. The first aircraft 82 also transmits a second type of interrogation request. This interrogation request is similar to the Automatic Dependent Surveillance Broadcast (ADS-B) interrogation request. However, in one embodiment, the interrogation request is specific to the U.S. military. Although this interrogation request is similar to an ADS-B request, the only data transmitted by the second aircraft 100 in response to the request is velocity information from the IRU 102.

Figure 7:
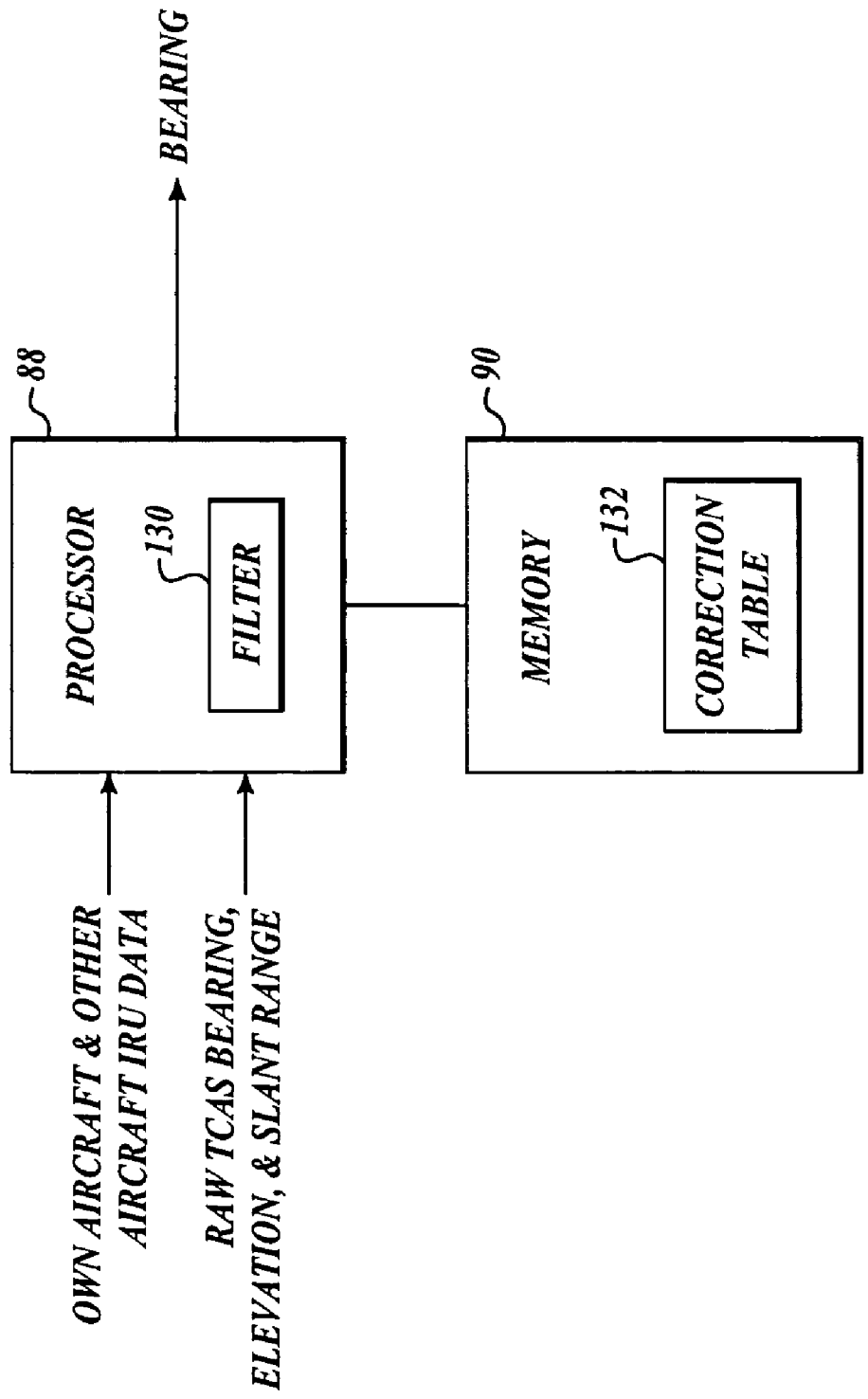

FIG. 7 illustrates a schematic view showing more detail for processor 88 and memory unit 90. A correction table 132 resides in the memory unit 90 and a filter 130 is implemented using the processor 88. IRU data from both the first aircraft 82 shown as own aircraft and the second aircraft 100 shown as other aircraft are used as input to the processor 88, as are raw TCAS bearing, elevation, and slant range data from the second aircraft 100. The processor 88 uses this raw data to obtain a corrected value from the correction table 132 residing in memory and uses the filter 130 to integrate the corrected TCAS data with the IRU data and provide a bearing output.

Figure 8:
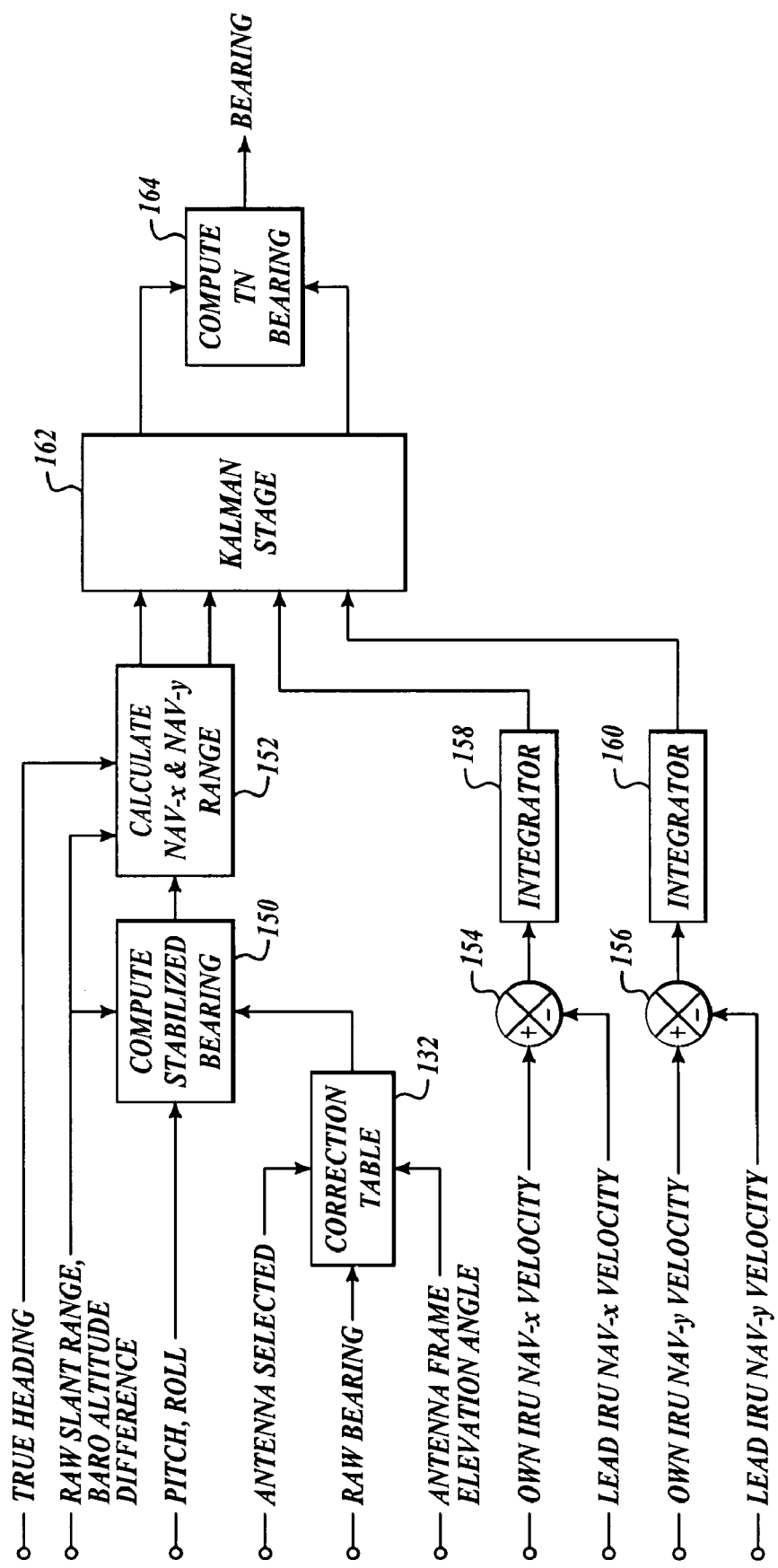

FIG. 8 illustrates a more detailed schematic view of the components and processes occurring in the first aircraft 82. The correction table 132 takes three inputs to determine a corrected value, which is used as an input to a process to compute stabilized bearing at block 150. The inputs to the correction table 132 are antenna selected, raw bearing, and antenna frame elevation angle. The compute stabilized bearing process also takes the pitch and roll values as inputs as well as the raw slant range and barometric altitude difference between the second aircraft 100 and the first aircraft 82. The output of the compute stabilized bearing process is used as a first input to a calculate NAV-x and NAV-y range at block 152. True heading, raw slant range, and barometric altitude difference are used as additional inputs to the calculate NAV-x and NAV-y range at block 152. Own aircraft IRU NAV-x velocity and other aircraft IRU NAV-x velocity are used as inputs to a difference operator at junction 154, which subtracts the other IRU NAV-x velocity from the own aircraft NAV-x velocity and outputs this difference, which is then used as an input to an integrator at block 158. Own aircraft IRU NAV-y velocity and other aircraft IRU NAV-y velocity are used as inputs to a difference operator at junction 156. The difference operator at junction 156 subtracts the other aircraft IRU NAV-y velocity from the own aircraft IRU NAV-y velocity and outputs the resulting value, which is used as an input for an integrator at block 160. The two outputs of the calculate NAV-x and NAV-y range at block 152 are used as inputs to a Kalman stage 162. The outputs of the integrator at block 158 and the integrator at block 160 together form an IRU range vector. These values are the other two inputs to the Kalman stage 162. The Kalman stage 162 outputs a filtered range vector with two components that are used as inputs to a compute true north (TN) bearing process at block 164. The compute true north bearing process provides a bearing value as an output.

FIG. 9 shows an example correction table 132. The values shown in the correction table 132 are for illustration purposes only and do not represent actual data. The table has four columns. The raw bearing, antenna selected, and antenna frame elevation angle columns are used in combination to find a result in the corrected value column.

Figure 10:
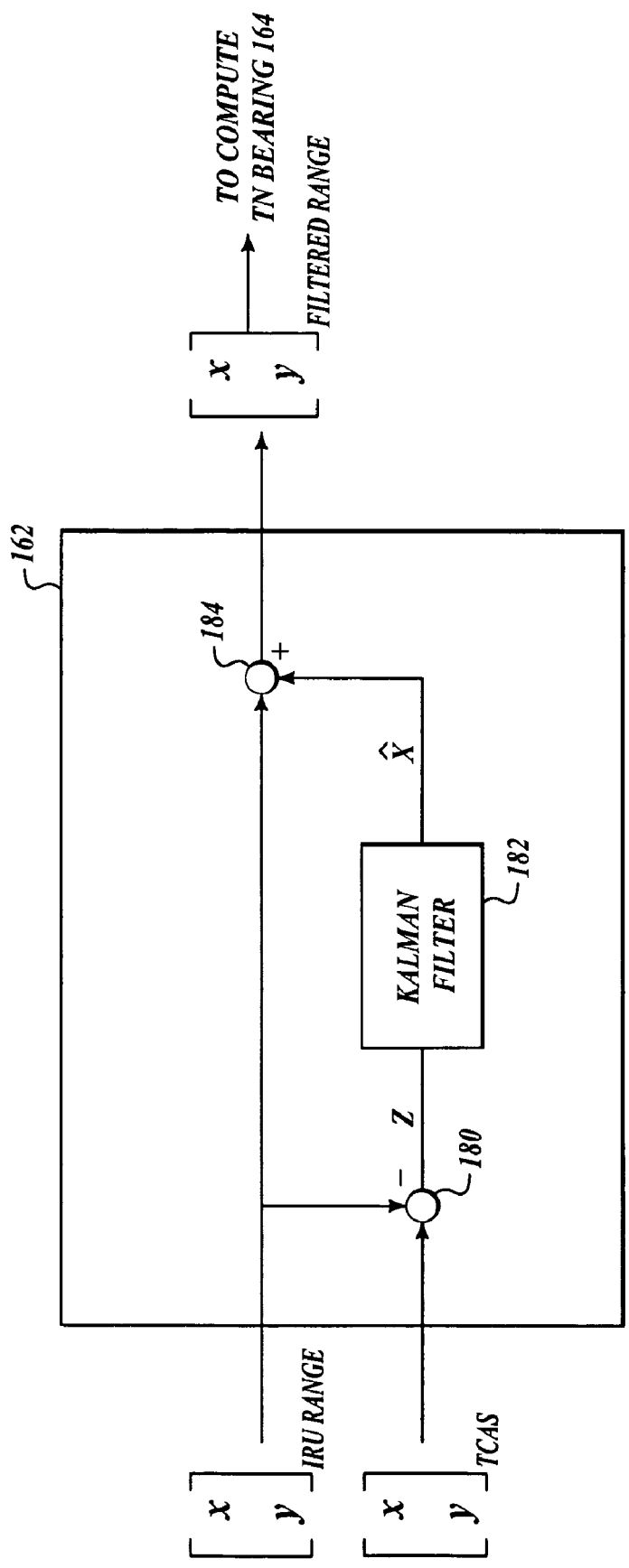
FIG. 10 illustrates a schematic view of a Kalman filter in accordance with an embodiment of the present invention

FIG. 10 illustrates a more detailed schematic view of the Kalman stage 162. An IRU range vector having x and y components and a TCAS vector having x and x components are inputs to the Kalman stage 162. The IRU range vector is subtracted from the TCAS vector by a difference operator at junction 180. The resultant vector is denoted as 'z' and is used as the input to a Kalman filter 182. The output of the Kalman filter 182 is denoted as $\hat{x}$ and is added to the original IRU range vector using an addition operator at junction 184. This result is the output of the Kalman stage 162 and is a filtered range vector having x and y components. The filtered range vector is used as an input to the compute TN bearing process at block 164.

Figure 11:
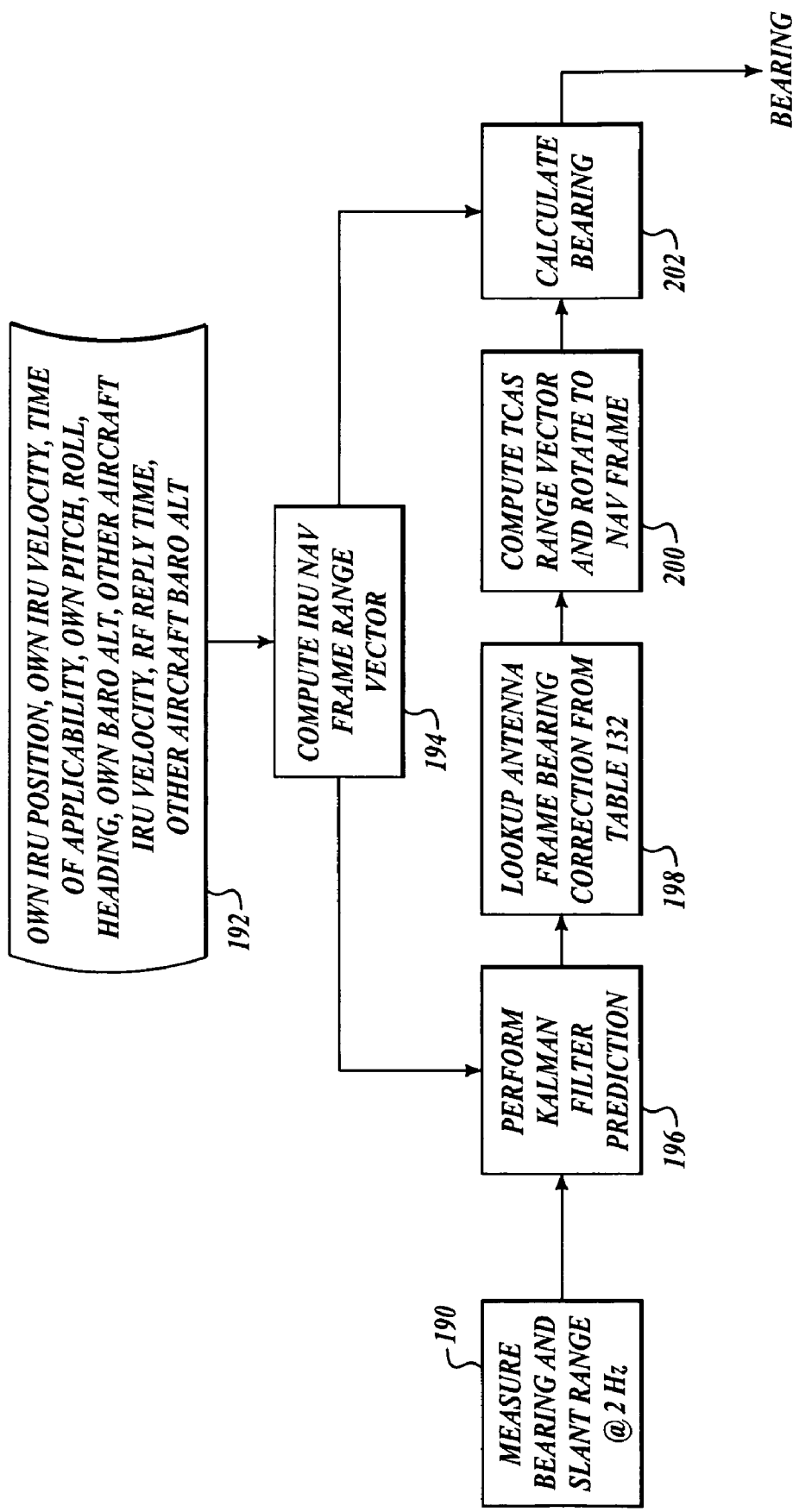
FIG. 11 is a flowchart of an example process occurring in the system of FIG. 6 in accordance with an another embodiment of the present invention.

FIG. 11 is an alternative schematic view of the processes shown in FIG. 8. A measure bearing and slant range at 2 Hz process at block 190, which is TCAS data, is used as an input to a perform Kalman filter prediction step at block 196. A number of other data elements are used as inputs to a compute IRU navigation (NAV) frame range vector process at block 194. These elements are contained in box 192 and include own IRU position, own IRU velocity, time of applicability, own pitch, roll, heading, own barometric altitude, other aircraft barometric altitude, other aircraft IRU velocity, and radio frequency (RF) reply time. The output of the compute IRU NAV frame range vector process at block 194 is used as the other input to the perform Kalman filter prediction step at block 196 as well as an input to a calculate bearing step at block 202. The Kalman filter prediction step at block 196 provides a more accurate estimation of elevation angle as an output that is used as an input to a block 198 that looks up an antenna frame bearing correction from the table 132. This corrected value is used as an input to a compute TCAS range vector and rotate to NAV frame step at block 200. This rotated range vector is used as the other input to the calculate bearing step at block 202. The desired bearing is produced as output from the calculate bearing step at block 202.

Figure 12:
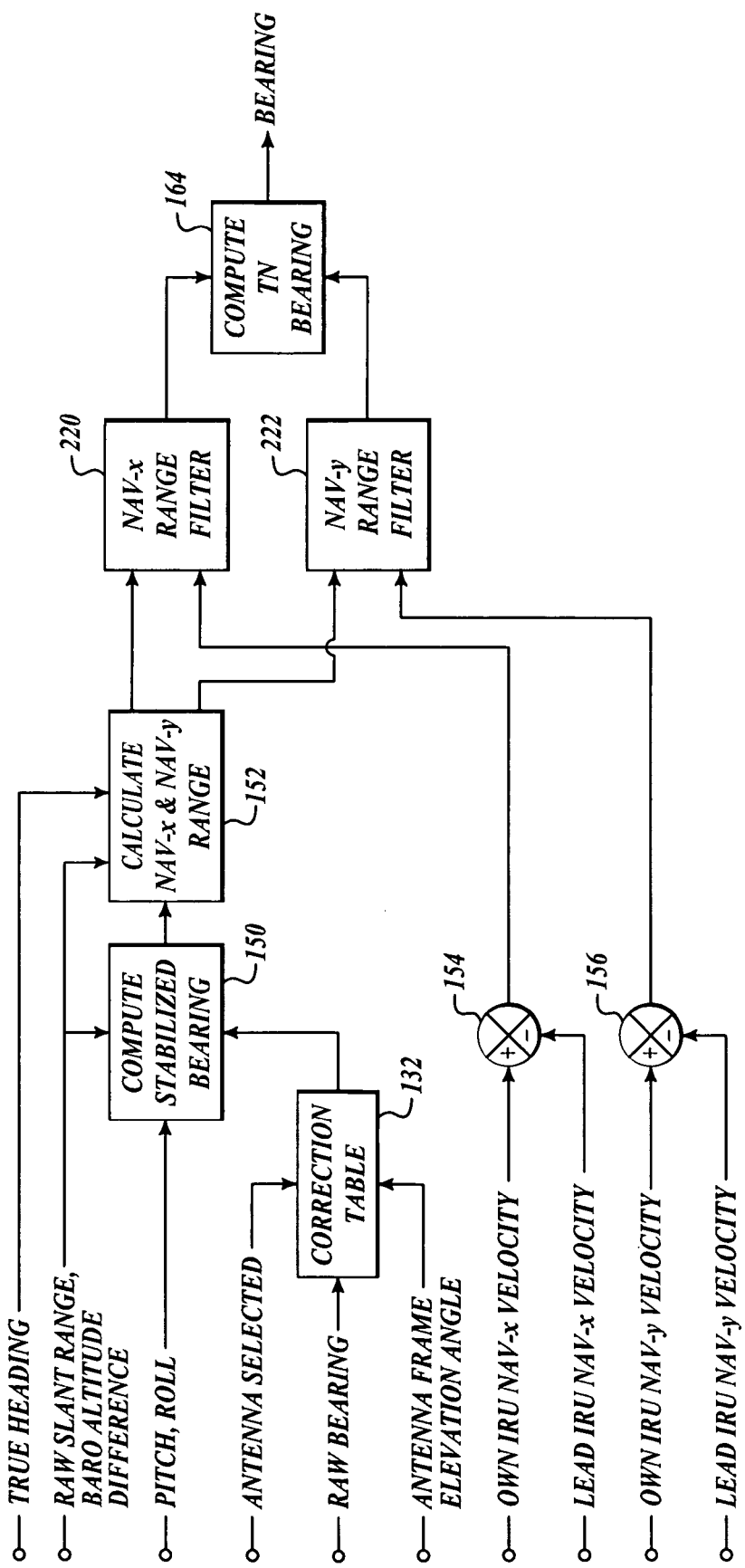
FIGS. 12 and 13 illustrate schematic views of a system in a first aircraft in accordance with an alternative embodiment of the present invention.

FIG. 12 shows a schematic view of an alternative example system which is similar to FIG. 8, except that the Kalman stage 162 has been replaced by two complementary filters and the integrators at blocks 158 and 160 are no longer required. The two complementary filters are designated as a NAV-x range filter 220 and a NAV-y range filter 222. The NAV-x range filter 220 takes its inputs from the NAV-x component output of the calculate NAV-x and NAV-y range at block 152 and the output of the difference operator at junction 154. The NAV-y range filter 222 takes as inputs the NAV-y component output from the calculate NAV-x and NAV-y range at block 152 and the output from the difference operator at junction 156. The outputs of the NAV-x range filter 220 and the NAV-y range filter 222 are used as inputs to the compute TN bearing process at block 164. The other items shown in FIG. 12 have already been identified in the description for FIG. 8.

Figure 13:
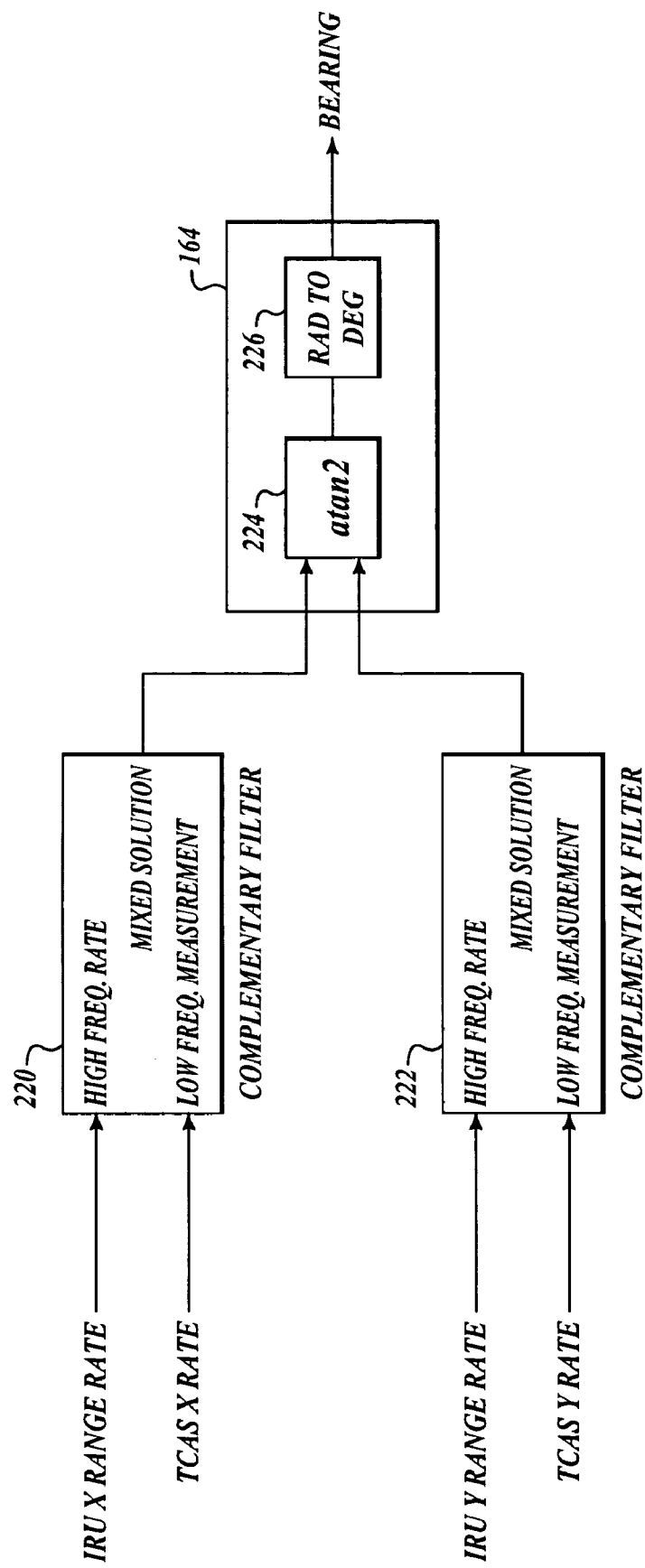

FIG. 13 illustrates a slightly more detailed schematic view of the NAV-x range filter 220, the NAV-y range filter 222, and the compute TN bearing step at block 164 shown in FIG. 12. Data values entering the NAV-x range filter 220 are an IRU X range rate and a TCAS X range. The IRU X range rate is a high frequency rate and the TCAS X range value is a low frequency measurement. Both the NAV-x range filter 220 and the NAV-y range filter 222 are complementary filters. The NAV-x range filter 220 and the NAV-y range filter 222 are both structured as proportional, integral, double integral, derivative filters. The NAV-y range filter 222 takes inputs IRU Y range rate and TCAS Y range. The IRU Y range rate input is a high frequency rate and the TCAS Y range input is a low frequency measurement. The outputs of both filters are designated as mixed solutions because they result from both IRU and TCAS inputs. The two mixed solution values from the outputs of the NAV-x range filter 220 and the NAV-y range filter 222 are then used as inputs to the compute TN bearing process at block 164. The first stage of the compute TN bearing process at block 164 is an atan 2 step at block 224, which converts the two inputs into an angle in radians. This value is converted from radians to degrees in step 226, which outputs the desired bearing value.

While the preferred embodiment of the invention has been illustrated and described, as noted above, many changes can be made without departing from the spirit and scope of the invention. For example, various types of filters in addition to the Kalman and complementary filters described can be used in alternative embodiments. Also, for example, the correction table may be created using the military version of ADS-B transmissions. Additionally, raw TCAS bearing values can be corrected before filtration by using means other than a table. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A device for determining a bearing of a vehicle, the device comprising:
   a communication means; and
   a processor in data communication with the communication means, wherein the processor is configured to:
      receive Inertial Reference Unit (IRU) data and Traffic Alert Collision Avoidance System (TCAS) data from the vehicle via the communication means; and
      generate a bearing value using the received TCAS and IRU data.

2. The device of claim 1, wherein the processor includes a filter and wherein the processor is configured to use the filter to generate the bearing value.

3. The device of claim 2, wherein the filter is a Kalman filter.

4. The device of claim 2, wherein the filter is a complementary filter.

5. The device of claim 2, wherein the processor is further configured to determine corrected TCAS data, and wherein the processor is configured to generate the bearing value based on the determined corrected data.

6. The device of claim 5, wherein the processor is configured to determine the corrected TCAS bearing data based on raw TCAS bearing data, a selected antenna, and an antenna elevation angle value.

7. The device of claim 6, wherein the device further comprises:
   a memory unit in data communication with the processor; and
      wherein the corrected TCAS bearing data is determined using a correction table stored in the memory unit, the correction table having been previously created using Automatic Dependent Surveillance Broadcast (ADS-B) data and TCAS data.

8. The device of claim 1, wherein the communication means comprises:
   a first component to send one or more interrogation signals;
   a second component to receive TCAS replies based on at least one of the one or more interrogation signals; and
   a third component to receive IRU data based on at least one of the one or more interrogation signals.

9. The device of claim 1, wherein the device is situated on a first aircraft, the vehicle is a second aircraft, and wherein the processor is configured to use IRU data from both the first and second aircraft.

10. A method for determining the bearing of a vehicle, the method comprising:
    sending one or more interrogation signals;
    receiving a TCAS reply from the vehicle based on at least one of the one or more interrogation signals;
    receiving IRU data from the vehicle based on at least one of the one or more interrogation signals; and
    determining an improved bearing value based on the received IRU data and the TCAS reply.

11. The method of claim 10, wherein determining the improved bearing value includes filtering the data.

12. The method of claim 11, wherein filtering the data makes use of one or more Kalman filters.

13. The method of claim 11, wherein filtering the data makes use of one or more complementary filters.

14. The method of claim 10, wherein determining an improved bearing value includes first determining corrected TCAS data, and then determining an improved bearing value based on the corrected TCAS data and the received IRU data.

15. The method of claim 14, wherein determining corrected TCAS data is performed by using raw TCAS bearing, selected antenna, and antenna elevation angle values in combination to find a corrected TCAS bearing value based on a value determined earlier using TCAS bearing, selected antenna, antenna elevation angle, and positional data that is more accurate than TCAS data.

16. The method of claim 15, wherein the corrected TCAS data is determined using a correction table stored in the memory unit, the correction table having been previously created using ADS-B data in combination with TCAS data.

17. The method of claim 10, wherein the sending, receiving, and determining occur with respect to a first aircraft, the vehicle is a second aircraft, and wherein determining an improved bearing value is based on IRU data from both the first and second aircraft and the TCAS reply from the second aircraft.

* * * * *